(12) United States Patent
El-Refaie et al.

(10) Patent No.: US 7,652,404 B2
(45) Date of Patent: Jan. 26, 2010

(54) SYNCHRONOUS RELUCTANCE MACHINE

(75) Inventors: Ayman Mohamed Fawzi El-Refaie, Niskayuna, NY (US); John Michael Kern, Rexford, NY (US); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 278 days.

(21) Appl. No.: 11/755,784

(22) Filed: May 31, 2007

(65) Prior Publication Data

US 2008/0296994 A1  Dec. 4, 2008

(51) Int. Cl.
 *H02K 1/22* (2006.01)
(52) U.S. Cl. .................... 310/216.017; 310/216.007
(58) Field of Classification Search ......... 310/112–114, 310/162–166, 216, 261, 266, 216.004, 216.006, 310/216.007, 216.011, 216.015, 216.017, 310/261.1
 See application file for complete search history.

(56) References Cited

U.S. PATENT DOCUMENTS

| | | | |
|---|---|---|---|
| 4,918,831 A | | 4/1990 | Kliman |
| 5,010,267 A | * | 4/1991 | Lipo et al. ................... 310/162 |
| 5,266,859 A | | 11/1993 | Stanley |
| 5,296,773 A | * | 3/1994 | El-Antably et al. ......... 310/261 |
| 5,684,352 A | | 11/1997 | Mita et al. |
| 5,841,212 A | | 11/1998 | Mita et al. |
| 6,255,005 B1 | | 7/2001 | Yokoyama et al. |
| 6,300,703 B1 | * | 10/2001 | Kawano et al. ............. 310/261 |
| 6,313,560 B1 | | 11/2001 | Dooley |
| 6,769,167 B2 | * | 8/2004 | Lee et al. ....................... 29/596 |
| 6,822,417 B2 | * | 11/2004 | Kawaji et al. ............... 318/701 |
| 6,849,983 B2 | | 2/2005 | Tajima et al. |
| 6,998,757 B2 | * | 2/2006 | Seguchi et al. .............. 310/266 |
| 7,154,191 B2 | | 12/2006 | Jansen et al. |
| 2004/0189108 A1 | | 9/2004 | Dooley |
| 2004/0201358 A1 | * | 10/2004 | Kawaji et al. ............... 318/701 |
| 2004/0245869 A1 | | 12/2004 | Dooley |

FOREIGN PATENT DOCUMENTS

| | | | | |
|---|---|---|---|---|
| JP | 60219945 | A | * | 11/1985 |
| JP | 11168864 | A | * | 6/1999 |
| JP | 11206082 | A | * | 7/1999 |

OTHER PUBLICATIONS

Sanada et al., "Torque Ripple Improvement for Synchronous Reluctance Motor Using an Asymmetric Flux Barrier Arrangement", IEEE Transactions on Industry Applications, vol. 40, No. 4, Jul./Aug. 2004, pp. 1076-1082.

* cited by examiner

*Primary Examiner*—Tran N Nguyen
(74) *Attorney, Agent, or Firm*—Penny A. Clarke (57) ABSTRACT

A synchronous reluctance machine is provided. The synchronous reluctance machine includes a stator having a stator core, the stator core including a number of fractional-slot concentrated windings wound around multiple stator teeth. The synchronous reluctance machine also includes a rotor having a rotor core and disposed with an air gap inside and concentric with the stator, wherein the rotor core includes a number of laminated sheets, wherein each of the laminated sheets is axially skewed with respect to neighboring ones of the laminated sheets, and wherein each of the laminated sheets includes multiple ferromagnetic regions and multiple non-ferromagnetic regions formed of a single material.

24 Claims, 8 Drawing Sheets

SYNCHRONOUS RELUCTANCE MACHINE

BACKGROUND

The invention relates generally to synchronous reluctance machines and more specifically to, fault tolerant synchronous reluctance machines.

Electric machines such as alternating current (AC) machines are typically not inherently fault tolerant. One of the primary reasons is that windings of AC machines are closely coupled magnetically. Thus, a short circuit in one winding affects adjacent phases. In a permanent magnet AC machine, rotating magnets generate potentially dangerous high currents in a short circuit path. Hence, adjacent phases may be seriously affected.

On the other hand, an electric machine such as a synchronous reluctance machine does not have rotating magnets, which makes it significantly more fault-tolerant. The fault-tolerance of a synchronous reluctance machine can be further enhanced by using concentrated windings on projecting stator poles. In this case, the phase windings are devoid of magnetic coupling so that high currents in a winding do not magnetically induce high currents in adjacent phase windings. A pair of diametrically opposite pole windings on the stator is connected in series or parallel to form an independent phase winding of a multiphase synchronous reluctance machine. Motoring torque is produced by switching current in each phase winding in a predetermined sequence that is synchronized with angular position of the rotor such that a magnetic force of attraction results between the poles of the rotor and the stator that approach each other.

In a typical synchronous reluctance machine, the rotor includes a series of alternating channels of iron and air extending axially along an active length of the machine. The iron channels provide an easy path for eddy current generated by the windings on the stator poles to flow. Consequently, this may lead to an undesirable amount of eddy current loss.

Further, while the typical synchronous reluctance machine provides several advantages over conventional electric machines such as AC machines as discussed above, a significant amount of noise, torque-ripple, vibration and windage losses may occur at high operating speeds and high operating temperatures if not properly designed.

Hence, there is a need to design an improved synchronous reluctance machine that addresses the aforementioned issues.

BRIEF DESCRIPTION

In accordance with one embodiment of the invention, a synchronous reluctance machine is provided. The synchronous reluctance machine includes a stator comprising a stator core, the stator core comprising a number of fractional-slot concentrated windings wound around multiple stator teeth. The synchronous reluctance machine also includes a rotor comprising a rotor core and disposed with an air gap inside and concentric with the stator, wherein the rotor core comprises a number of laminated sheets, wherein each of the laminated sheets is axially skewed with respect to neighboring ones of the laminated sheets, and wherein each of the laminated sheets includes multiple ferromagnetic regions and multiple non-ferromagnetic regions formed of a single material.

In accordance with another embodiment of the invention, a synchronous reluctance machine is provided. The synchronous reluctance machine includes a stator having a stator core, the stator core including a number of fractional-slot concentrated windings wound around multiple stator teeth. The synchronous reluctance machine also includes a rotor including a rotor core and disposed with an air gap outside and concentric with the stator, wherein the rotor core comprises a number of laminated sheets, wherein each of the laminated sheets is axially skewed with respect to neighboring ones of the laminated sheets, and wherein each of the laminated sheets comprises multiple ferromagnetic regions and multiple non-ferromagnetic regions formed of a single material.

In accordance with another embodiment of the invention, a synchronous reluctance machine is provided. The synchronous reluctance machine includes a stator having an inner stator portion and an outer stator portion, wherein the inner stator portion includes an inner surface and a number of inner fractional-slot windings wound around multiple inner stator teeth disposed on the inner surface, and wherein the outer stator portion is disposed concentrically around the inner stator portion and includes an outer surface and multiple outer fractional-slot windings wound around multiple outer stator teeth disposed on the outer surface. The synchronous reluctance machine also includes a rotor having an inner rotor core and an outer rotor core, wherein the stator is disposed concentrically between the inner and outer rotor cores about a central axis, wherein the outer rotor core includes a number of outer laminated sheets, each of the outer laminated sheets being axially skewed with respect to neighboring ones of the outer laminated sheets and including multiple outer ferromagnetic regions and multiple outer non-ferromagnetic regions formed of a single material, and wherein the inner rotor core includes multiple inner laminated sheets, each of the inner laminated sheets being axially skewed with respect to neighboring ones of the inner laminated sheets and having multiple inner ferromagnetic regions and multiple inner non-ferromagnetic regions formed of a single material.

In accordance with another embodiment of the invention, a synchronous reluctance machine is provided. The synchronous reluctance machine includes a stator having an inner stator portion and an outer stator portion, wherein the inner stator portion includes an outer surface and a number of inner fractional-slot windings wound around a plurality of inner stator teeth disposed on the outer surface, and wherein the outer stator portion includes an inner surface and multiple outer fractional-slot windings wound around multiple outer stator teeth disposed on the inner surface. The synchronous reluctance machine also includes a double sided rotor having an inner rotor side and an outer rotor side, wherein the double sided rotor is concentrically disposed between the inner stator portion and the outer stator portion about a central axis, wherein the outer rotor side includes a number of outer laminated sheets, each of the outer laminated sheets being axially skewed with respect to neighboring ones of the outer laminated sheets and including multiple outer ferromagnetic regions and multiple outer non-ferromagnetic regions formed of a single material, and wherein the inner rotor side includes a number of inner laminated sheets, each of the inner laminated sheets being axially skewed with respect to neighboring ones of the inner laminated sheets and including multiple inner ferromagnetic regions and multiple inner non-ferromagnetic regions formed of a single material.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed to fault tolerant synchronous reluctance machines. As used herein, the term 'fault tolerant' refers to magnetic decoupling between phases while reducing noise, torque ripple, and harmonic flux components.

Figure 1:
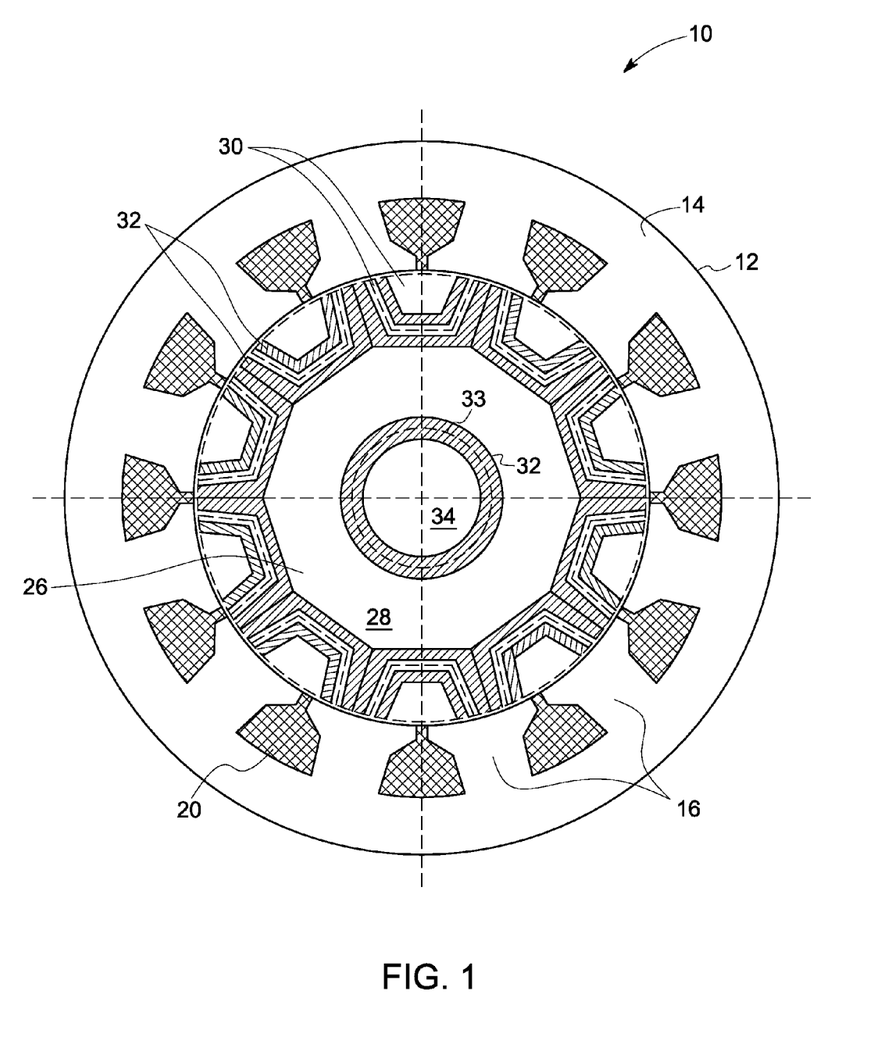
FIG. 1 is a cross-sectional view of a synchronous reluctance machine in accordance with embodiments of the invention.

FIG. 1 is a diagrammatic illustration of a synchronous reluctance machine 10. The synchronous reluctance machine 10 comprises a stator 12 including a stator core 14. The stator core 14 includes multiple stator teeth 16. Windings 20 are wrapped around the stator teeth 16. In a presently contemplated embodiment, the windings 20 are fractional slot concentrated windings. Each pair of diametrically opposite stator teeth 16 is connected in series or parallel to form an independent phase winding of the synchronous reluctance machine 10. In an exemplary embodiment, the synchronous reluctance machine has a three phase winding.

Figure 2:
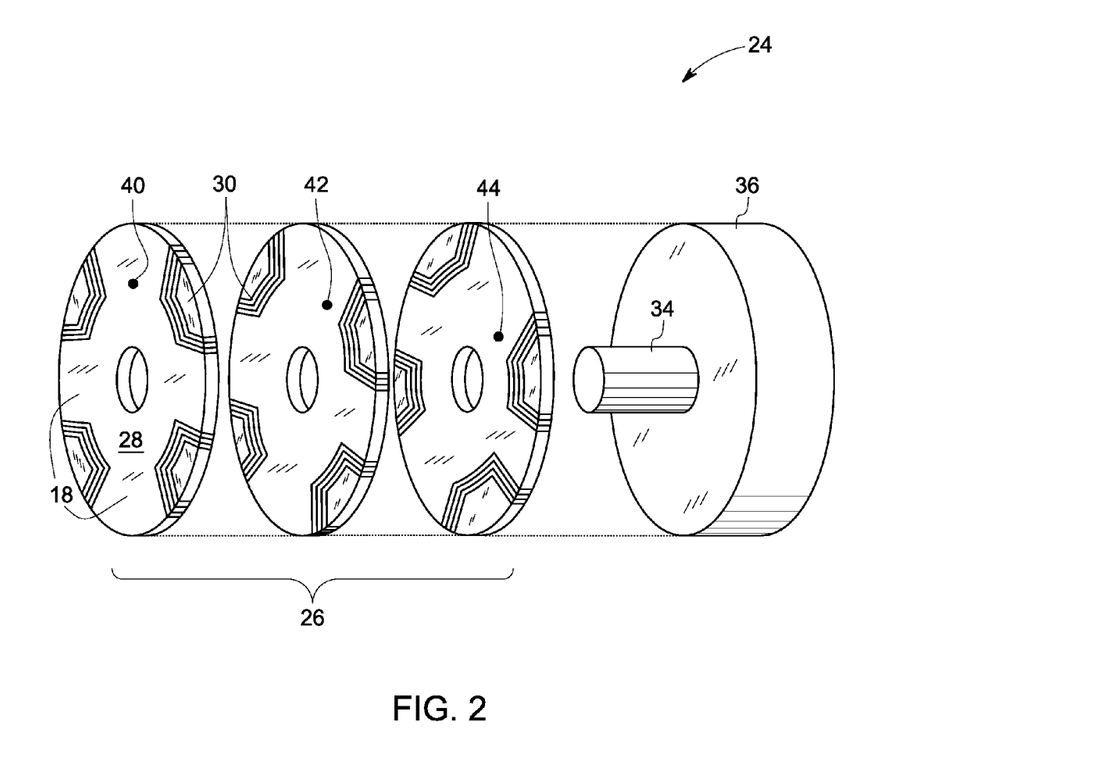
FIG. 2 is a perspective view of an exemplary arrangement of laminated sheets used in the rotor in FIG. 1.

The synchronous reluctance machine 10 also includes a rotor 24 (shown in FIG. 2) having a rotor core 26 and disposed with an air gap 18 inside and concentric with the stator 12. As indicated in FIG. 2, the rotor core 26 includes multiple laminated sheets 28 disposed on top of each other. In a particular embodiment, the laminated sheets 28 are axially skewed with respect to neighboring ones. In more particular embodiments, the laminated sheets 28 have an integral structure. The laminated sheets 28 include multiple ferromagnetic regions 30 and non-ferromagnetic regions 32 formed of a single material and are selectively formed so as to enhance a synchronous component reluctance torque and reduce a contribution of undesirable harmonic components of magnetic flux generated by the windings 20. In the presently illustrated embodiment, a lower order harmonic component of flux generated in the rotor 24 follows a path 33 around a shaft 34. This path around the shaft is treated to become nonmagnetic to reduce or filter out the undesirable lower order flux harmonic component. Further, a synchronous harmonic component of flux follows a path 38. Non-ferromagnetic regions 32 are selectively formed so as to maximize the synchronous component and hence the machine reluctance torque. In an example, a lower order harmonic component of magnetic flux may be eliminated by selective formation of the non-ferromagnetic regions 32. In another embodiment, the non-ferromagnetic regions 32 may also be selectively formed to maximize contribution of a particular harmonic component.

In a particular embodiment, the single material that forms the multiple ferromagnetic regions 30 and non-ferromagnetic regions 32 is a dual phase ferromagnetic material. One example of the dual phase ferromagnetic material is disclosed in U.S. Pat. No. 6,255,005, to Tsutomu Inui et al, entitled "Composite magnetic member, method of producing ferromagnetic portion of same, and method of forming non-magnetic portion of same" and has a composition of Iron (Fe), 17.5% Chromium (Cr), 2% Nickel (Ni), 0.8% Aluminum (Al), 0.5% Carbon (C). In other examples, Cobalt is added to increase the magnetization. In other examples, chromium is replaced by weaker carbide forms, such as Mn, to increase the magnetization and reduce the thermal gradient required to create the dual-phase structure. In another embodiment, the laminated sheets 28 are subjected to a localized surface treatment to form the non-ferromagnetic regions 20.

In a particular embodiment, the non-ferromagnetic regions 32 are subjected to a localized surface treatment by various means in order to induce an irreversible phase transformation to create the non-ferromagnetic areas. Non-limiting examples include local heat treatment by a laser beam, high temperature plasma and an electron beam or by mechanical strain. Beneficially, since the rotor 24 is made of a stack or laminations that are skewed, the non-ferromagnetic regions 32 reduce undesirable harmonic flux components in the synchronous reluctance machine 10.

FIG. 2 is a perspective view of a stack of laminated sheets 28 forming a rotor 24. In the illustrated example, a holder 36 having a shaft 34 as referenced in FIG. 1 holds the laminated sheets 28. As discussed in FIG. 1, the rotor 24 includes a rotor core 26. The laminated sheets 28 are locally surface-treated to induce an irreversible phase transformation that creates ferromagnetic regions 30 and non-ferromagnetic regions 32 that are selectively formed. In a particular embodiment, the laminated sheets 28 are surface treated by a localized heat treatment by a laser. In another embodiment, a localized surface treatment is provided by electron beam radiation. For ease of illustration, the laminated sheets 28 shown in FIG. 2 include an alternate arrangement of only two non-ferromagnetic regions 32 and two ferromagnetic regions 30. However, the invention is not limited to a specific number of rotor-poles.

The laminated sheets 28 are axially skewed with respect to neighboring ones in a specific pattern such that a point at a location 40 on a first sheet is at a location 42 in a second sheet and further at a location 44 on a third sheet. For ease of simplicity, there are three laminated sheets 28 shown in FIG. 2. However, the invention is not limited to a specific number of laminated sheets 28. Axial skewing enables reduction of undesirable effects such as, but not limited to, torque ripple. In a particular embodiment, the laminated sheets 28 are skewed in a straight pattern. In another embodiment, the laminated sheets 28 are skewed in a herringbone pattern. In yet another embodiment, skewing can also be nonlinear. In an example, the nonlinear skewing is helical skewing.

Figure 3:
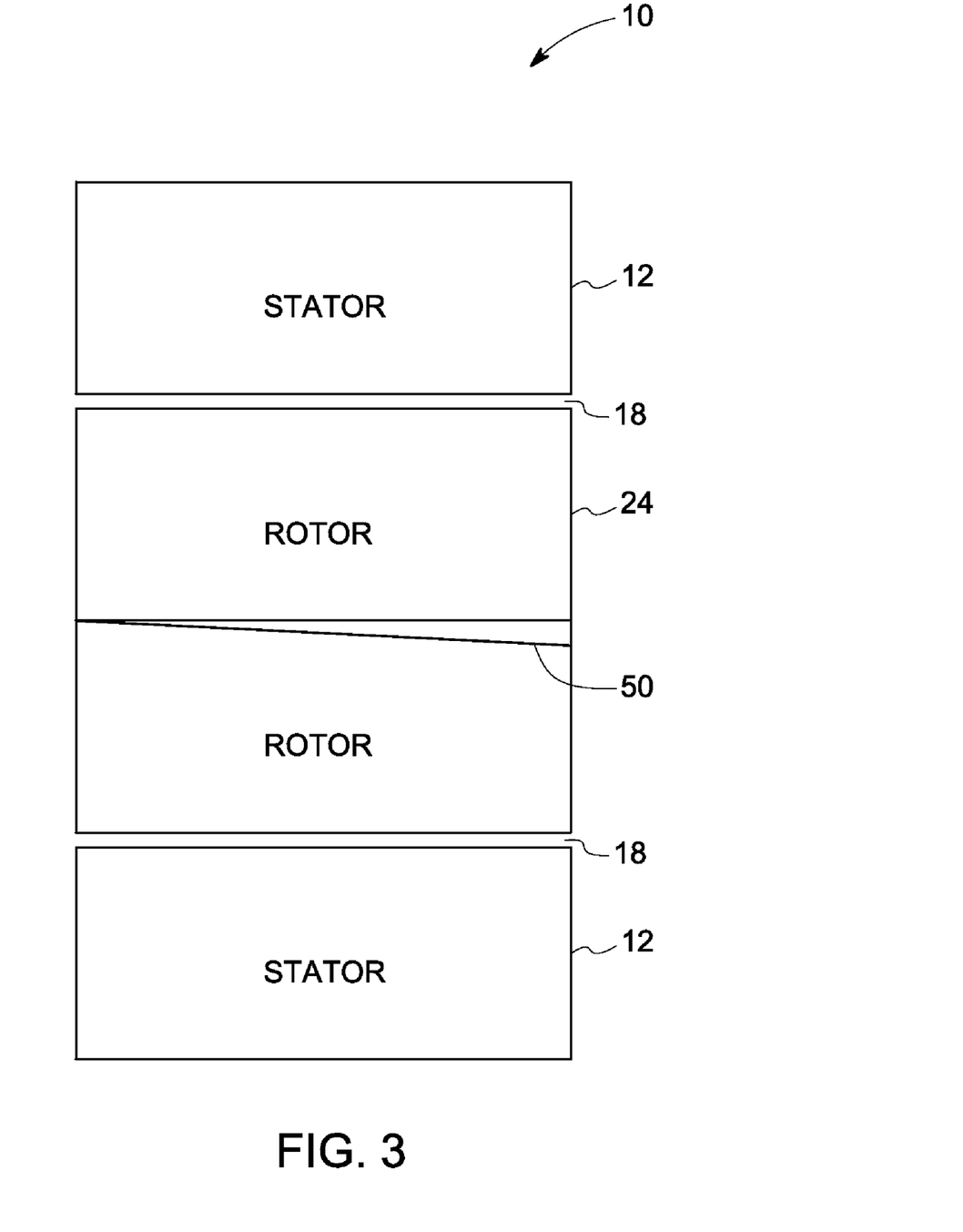
FIG. 3 is a schematic illustration of a top view of the synchronous reluctance machine in FIG. 1 depicting axial skewing in a straight pattern.

FIG. 3 is a schematic illustration of a top view of the synchronous reluctance machine 10 in FIG. 1 depicting axial skewing of the laminated sheets 28 in a straight pattern. A line 50 traces a path of a point on the rotor 24 through the laminated sheets 28 that are skewed in a straight pattern. The rotor 24 is disposed inside with an air gap 18 and concentric with the stator 12 as referenced in FIG. 1.

Figure 4:
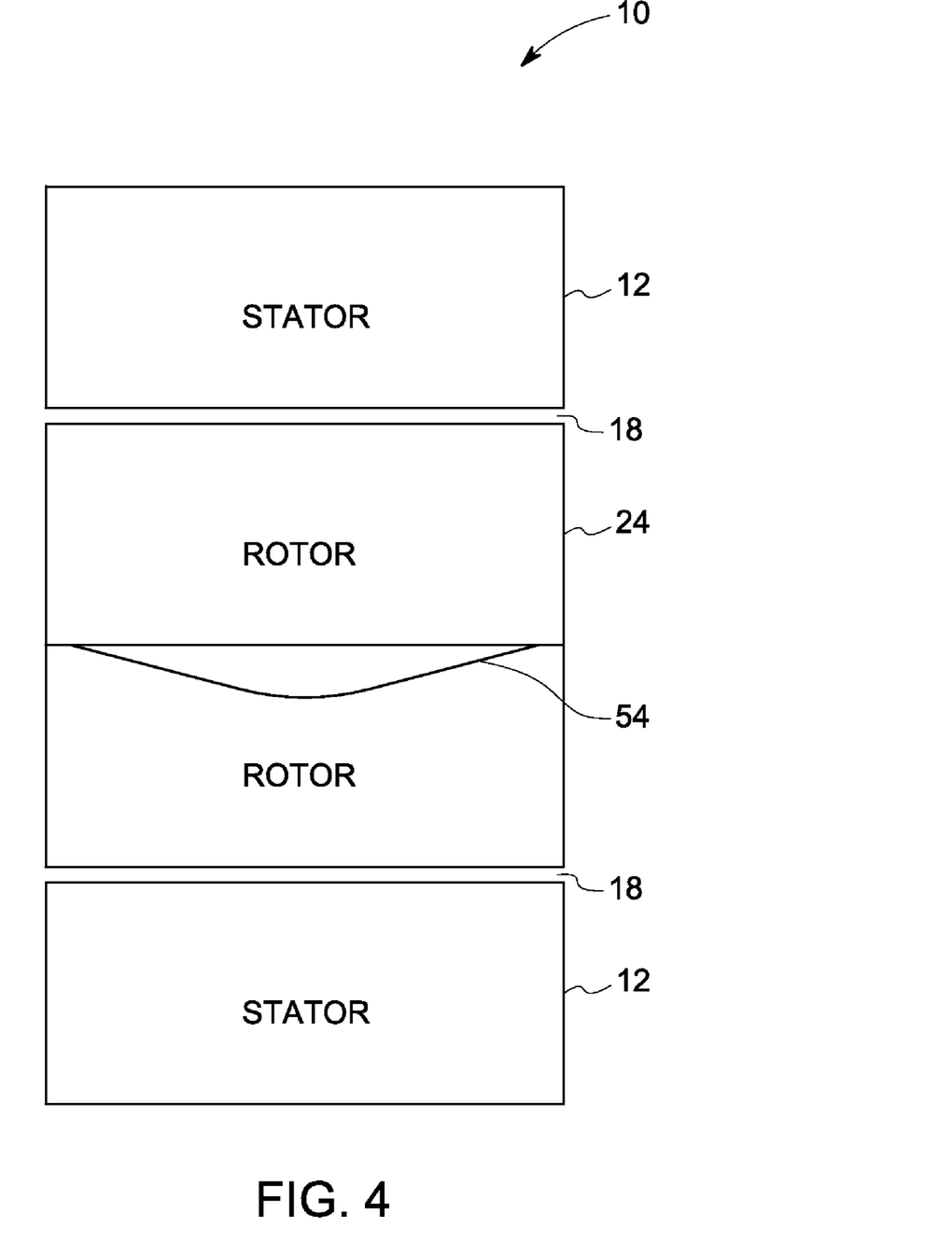
FIG. 4 is a schematic illustration of a top view of the synchronous reluctance machine in FIG. 1 depicting axial skewing in a herringbone pattern.

FIG. 4 is schematic illustration of a top view of the synchronous reluctance machine 10 in FIG. 1 depicting axial skewing of the laminated sheets 28 in a herring-bone pattern. A line 54 traces a path of a point on the rotor 24 through the laminated sheets 28 that are skewed in a herringbone pattern. The rotor 24 is disposed inside with an air gap 18 and concentric with the stator 12 as referenced in FIG. 1.

Figure 5:
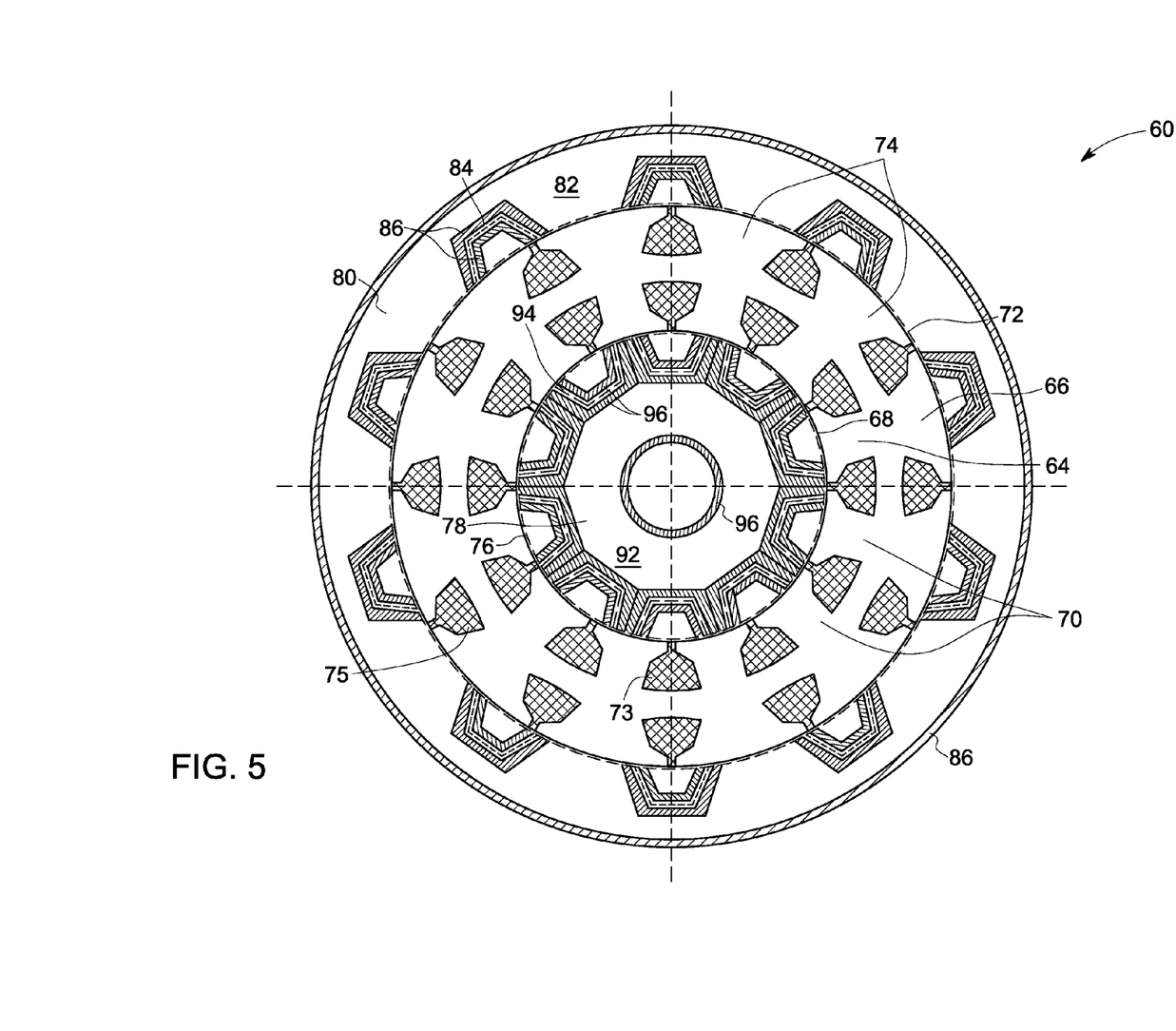
FIG. 5 is a cross-sectional view of a dual rotor synchronous reluctance machine in accordance with embodiments of the invention.

In accordance with another embodiment of the invention as shown in FIG. 5, a synchronous reluctance machine 60 is depicted. The synchronous reluctance machine 60 may also be termed a dual rotor synchronous reluctance machine. The synchronous reluctance machine 60 includes a stator 62 having an inner stator portion 64 and an outer stator portion 66. The inner stator portion 64 has an inner surface 68 and multiple inner stator teeth 70 disposed on the inner surface 68. The outer stator portion 66 is disposed concentrically around the inner stator portion 64 and includes an outer surface 72. The outer stator portion 66 also includes multiple outer stator teeth 74 disposed on the outer surface 72. Inner stator windings 73 and outer stator windings 75 are wrapped around the inner stator teeth 70 and the outer stator teeth 74 respectively. In a particular embodiment, the inner and outer stator portions 64, 66 may be integrally formed on single lamination(s). Although the inner and outer stator portions 64, 66 are shown as having the same number of slots in the illustrated example, the inner and outer stator portions 64, 66 may have different numbers of stator slots in other embodiments.

The synchronous reluctance machine 60 also includes a rotor 76 having an inner rotor core 78 and an outer rotor core 80. In exemplary embodiments, the inner rotor core 78 and the outer rotor core 80 may be connected to the same shaft or to different shafts. For the latter embodiment, the different shafts may rotate at different speeds. The stator 62 is disposed concentrically between the inner rotor core 78 and the outer rotor core 80. The outer rotor core 80 includes multiple axially skewed outer laminated sheets 82 having multiple outer ferromagnetic regions 84 and outer non-ferromagnetic regions 86 selectively formed of a single material as to enhance a synchronous component reluctance torque and reduce a contribution of an undesirable lower order harmonic component of magnetic flux generated by the outer stator windings 75. In particular, the ring shaped, outer non-ferromagnetic region 86 reduces the contribution of the lower order harmonic component of magnetic flux generated by the outer stator windings 75. In a particular embodiment, the single material is a dual phase ferromagnetic material.

Similarly, the inner rotor core 78 includes multiple axially skewed inner laminated sheets 92 having multiple inner ferromagnetic regions 94 and inner non-ferromagnetic regions 96 selectively formed of a single material to enhance a synchronous component reluctance torque and reduce a contribution of undesirable harmonic components of magnetic flux generated by the inner stator windings 73. In particular, the ring shaped, inner non-ferromagnetic region 96 reduces the contribution of the lower order harmonic component of magnetic flux generated by the inner stator windings 73. In a particular embodiment, the outer laminated sheets 88 and the inner laminated sheets 92 are subjected to a localized surface treatment to form the outer non-ferromagnetic regions 86 and the inner non-ferromagnetic regions 96 respectively. In a particular embodiment, the non-ferromagnetic regions 86 and 96 are heat-treated by various means. Some non-limiting examples include heating by a laser beam, high temperature plasma and an electron beam. Although the inner and outer rotor cores 78, 80 are shown as having the same number of rotor poles 94, 84 in the illustrated example, the inner and outer rotor cores 78, 80 may have different numbers of rotor poles in other embodiments.

Figure 6:
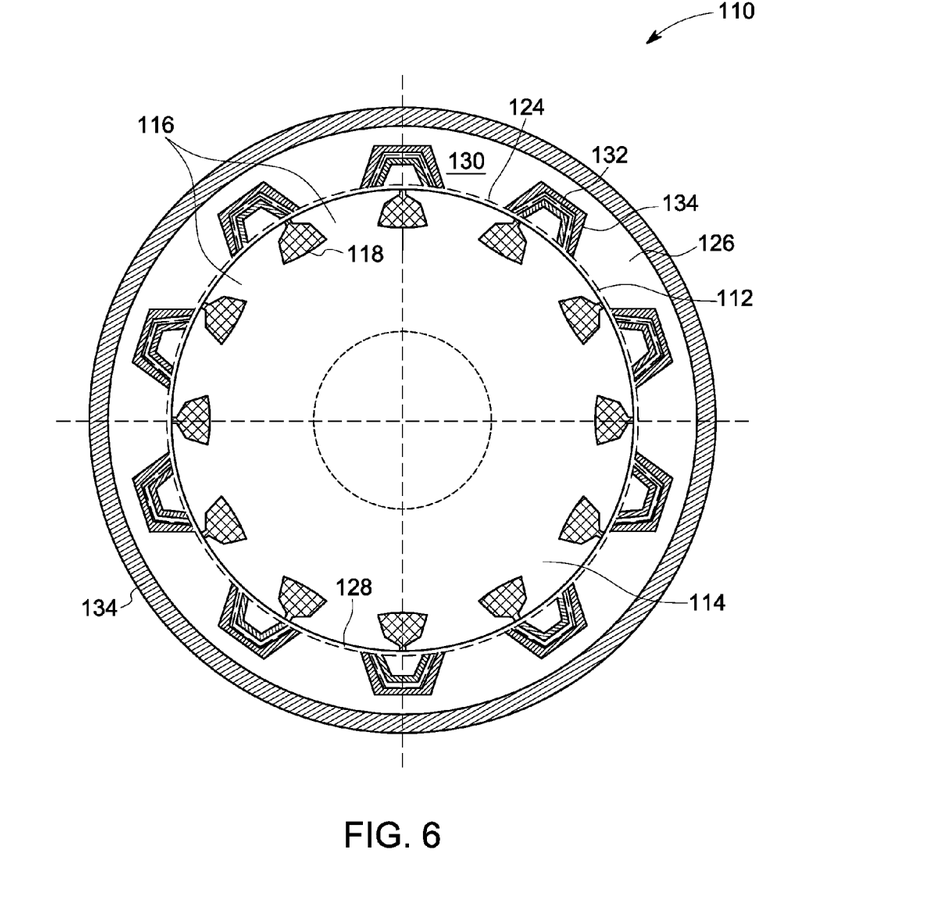
FIG. 6 is a cross-sectional view of an inside-out synchronous reluctance machine in accordance with embodiments of the invention.

In accordance with yet another embodiment of the invention as shown in FIG. 6 a synchronous reluctance machine 110 is depicted. The synchronous reluctance machine 110 may also be referred to as an inside-out synchronous reluctance machine. The synchronous reluctance machine 110 includes a stator 112 having a stator core 114. The stator core 114 includes multiple stator teeth 116. Windings 118 are wrapped around the stator teeth 116. Each pair of diametrically opposite stator teeth 116 is connected in series or parallel to form an independent phase winding of the synchronous reluctance machine 110.

The synchronous reluctance machine 110 also includes a rotor 124 having a rotor core 126 and disposed with an air gap 128 outside and concentric with the stator. The rotor core 126 includes multiple axially skewed laminated sheets 130 having multiple ferromagnetic regions 132 and multiple non-ferromagnetic regions 134 selectively formed of a single material to enhance a synchronous component reluctance torque and reduce contribution of undesirable lower order harmonic components of magnetic flux generated by the windings 118. In a particular embodiment, the single material is a dual phase ferromagnetic material.

In a particular embodiment, the laminated sheets 130 are subjected to a localized surface treatment to form the non-ferromagnetic regions 134. In a particular embodiment, the non-ferromagnetic regions 134 are heat-treated by various means. Non-limiting examples include heating by a laser beam, high temperature plasma and an electron beam.

Figure 7:
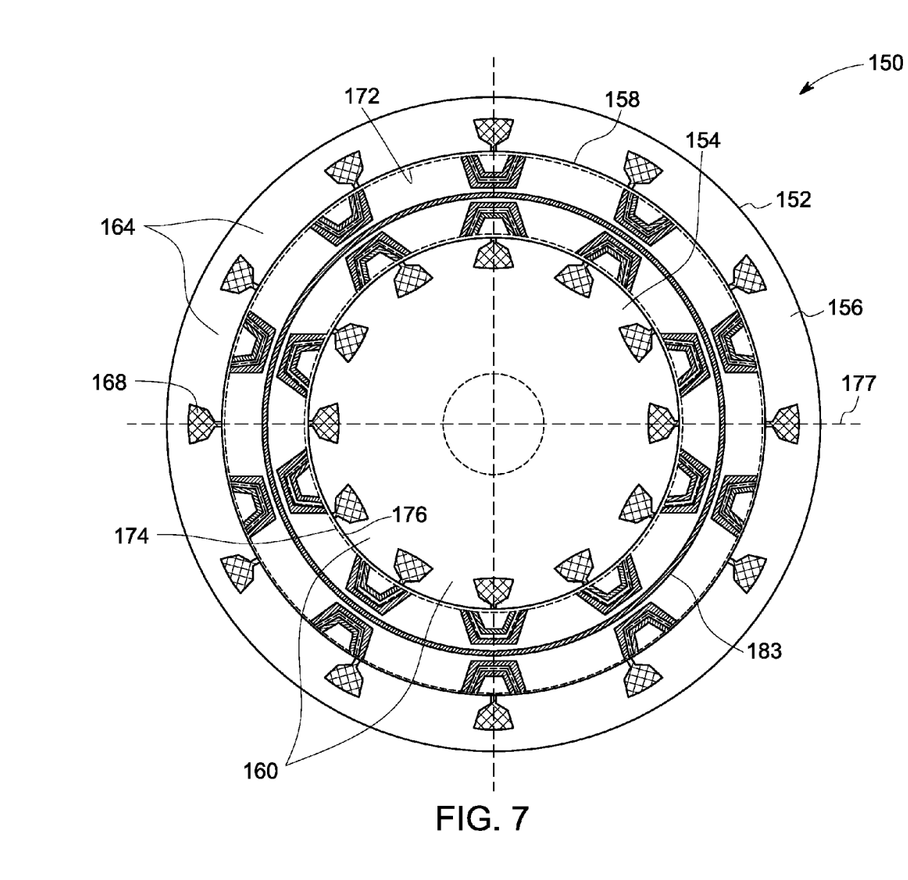
FIG. 7 is a cross-sectional view of a double-sided rotor synchronous reluctance machine in accordance with embodiments of the invention.

FIG. 7 is a cross-sectional view of another embodiment of a synchronous reluctance machine 150. The synchronous reluctance machine 150 may also be termed as a double-sided rotor synchronous reluctance machine. The synchronous reluctance machine 150 includes a stator 152 having an inner stator portion 154 and an outer stator portion 156. The inner stator portion 154 has an outer surface 159 and multiple inner stator teeth 160 disposed on the outer surface 159 of inner stator portion 154. The outer stator portion 156 includes an inner surface 158 and multiple outer stator teeth 164 disposed on the inner surface 158. Inner stator windings 166 and outer stator windings 168 are wrapped around the inner stator teeth 160 and the outer stator teeth 164 respectively. Although the inner and outer stator portions 154, 156 are shown as having the same number of slots in the illustrated example, the inner and outer stator portions 154, 156 may have different numbers of stator slots in other embodiments.

Figure 8:
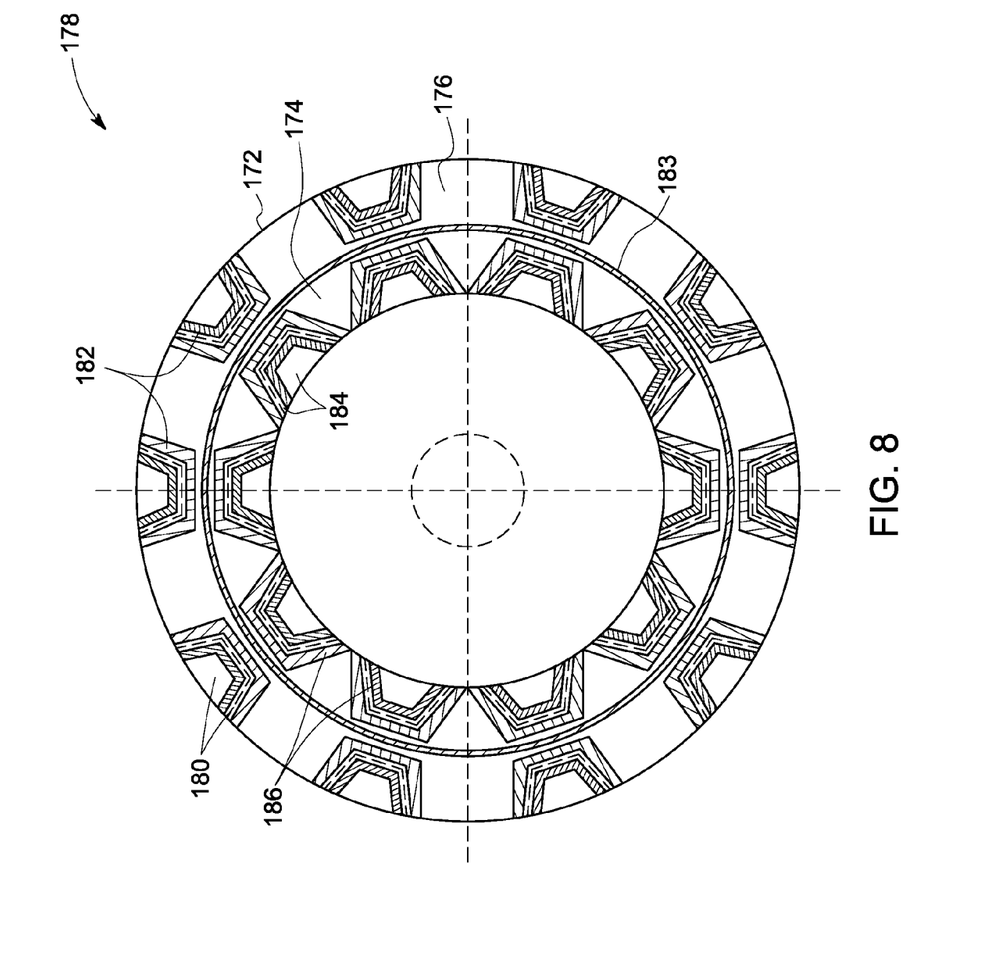
FIG. 8 shows an exemplary laminated sheet for the dual-sided rotor of FIG. 7.

The synchronous reluctance machine 150 also includes a double sided rotor 172 having an inner rotor side 174 and an outer rotor side 176. The double sided rotor 172 is disposed concentrically between the inner stator portion 154 and the outer stator portion 156 about a central axis 177. In a particular embodiment, the rotor 172 is made of a single lamination. Namely, the inner and outer rotor sides 174, 176 may be integrally formed on the same lamination(s). The laminations are then stacked to form the rotor. For particular embodiments, the dual sided rotor 172 comprises multiple axially skewed laminated sheets 178. An example laminated sheet 178 is illustrated in FIG. 8. As indicated in FIG. 8, for example, the at least one laminated sheet 178 defines multiple outer ferromagnetic regions 180 and outer non-ferromagnetic regions 182 selectively formed of a single material to enhance a synchronous component reluctance torque and reduce a contribution of undesirable harmonic components and a fundamental component of magnetic flux generated by the outer stator windings 168. In particular, the ring shaped, outer non-ferromagnetic region 183 reduces the contribution of undesirable harmonic components and a fundamental component of magnetic flux generated by the outer stator windings 168. In a particular embodiment, the single material is a dual phase ferromagnetic material.

Similarly, the laminated sheet 178 defines multiple inner ferromagnetic regions 184 and inner non-ferromagnetic regions 186 formed of a single material, as shown for example in FIG. 8. In a particular embodiment, each of the laminated sheet(s) 178 is subjected to a localized surface treatment to form the inner non-ferromagnetic regions 186 and the outer non-ferromagnetic regions 182 simultaneously. Although the inner and outer rotor sides 174, 176 are shown as having the same number of rotor poles 180 in the illustrated example, the inner and outer rotor sides 174, 176 may have different numbers of rotor poles in other embodiments. In another embodiment, the non-ferromagnetic regions 184 and 186 are heat-treated by various means. Some non-limiting examples include heating by a laser beam, high temperature plasma and an electron beam.

The various embodiments of a synchronous reluctance machine described above thus provide a way to provide a reluctance machine with minimal noise, vibrations, windage losses and torque ripple even at high operating speeds and high operating temperatures. These techniques and systems also allow for highly efficient synchronous reluctance machines.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of an example of laminated sheets axially skewed in a herringbone pattern in a rotor described with respect to one embodiment can be adapted for use with an inside-out synchronous reluctance machine described with respect to another. Similarly, the various features described, as well as other known equivalents for each feature, can be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A synchronous reluctance machine comprising:
a stator comprising a stator core, the stator core comprising a plurality of fractional-slot concentrated windings wound around a plurality of stator teeth; and
a rotor comprising a rotor core and disposed with an air gap inside and concentric with the stator, wherein the rotor core comprises a plurality of laminated sheets, and wherein each of the laminated sheets is axially skewed with respect to neighboring ones of the laminated sheets, and wherein each of the laminated sheets comprises a plurality of ferromagnetic regions and a plurality of non-ferromagnetic regions formed of a single material, wherein the ferromagnetic and the non-ferromagnetic regions are selectively formed so as to reduce a lower order harmonic component of magnetic flux generated by the fractional-slot concentrated windings.

2. The synchronous reluctance machine of claim 1, wherein the laminated sheets have an integral structure, wherein the single material comprises a dual phase ferromagnetic material, and wherein the laminated sheets are subjected to a localized surface treatment to form the non-ferromagnetic regions respectively.

3. The synchronous reluctance machine of claim 1, wherein the laminated sheets are skewed in a straight pattern.

4. The synchronous reluctance machine of claim 1, wherein the laminated sheets are skewed in a herringbone pattern.

5. The synchronous reluctance machine of claim 1, wherein the ferromagnetic and the non-ferromagnetic regions are further selectively formed so as to enhance a synchronous component reluctance torque.

6. The synchronous reluctance machine of claim 5, wherein at least one of the non-ferromagnetic regions is formed around an inner surface of the rotor core to reduce the lower order harmonic component of magnetic flux.

7. A synchronous reluctance machine comprising:
a stator comprising a stator core, the stator core comprising a plurality of fractional-slot concentrated windings wound around a plurality of stator teeth; and
a rotor comprising a rotor core and disposed with an air gap outside and concentric with the stator, wherein the rotor core comprises a plurality of laminated sheets, wherein each of the laminated sheets is axially skewed with respect to neighboring ones of the laminated sheets, and wherein each of the laminated sheets comprises a plurality of ferromagnetic regions and a plurality of non-ferromagnetic regions formed of a single material, wherein the ferromagnetic and the non-ferromagnetic regions are selectively formed so as to reduce a lower order harmonic component of magnetic flux generated by the fractional-slot concentrated windings.

8. The synchronous reluctance machine of claim 7, wherein the laminated sheets have an integral structure, wherein the single material comprises a dual phase ferromagnetic material, and wherein the laminated sheets are subjected to a localized surface treatment to form the non-ferromagnetic regions.

9. The synchronous reluctance machine of claim 7, wherein the laminated sheets are skewed in a straight pattern.

10. The synchronous reluctance machine of claim 7, wherein the laminated sheets are skewed in a herringbone pattern.

11. The synchronous reluctance machine of claim 7, wherein the ferromagnetic and the non-ferromagnetic regions are further selectively formed so as to enhance a synchronous component reluctance torque.

12. The synchronous reluctance machine of claim 11, wherein at least one of the non-ferromagnetic regions is formed around an outer surface of the rotor core to reduce the lower order harmonic component of magnetic flux.

13. A synchronous reluctance machine comprising:
a stator comprising an inner stator portion and an outer stator portion, wherein the inner stator portion comprises an inner surface and a plurality of inner fractional-slot windings wound around a plurality of inner stator teeth disposed on the inner surface, and wherein the outer stator portion is disposed concentrically around the inner stator portion and comprises an outer surface and a plurality of outer fractional-slot windings wound around a plurality of outer stator teeth disposed on the outer surface; and
a rotor comprising an inner rotor core and an outer rotor core, wherein the stator is disposed concentrically between the inner and outer rotor cores about a central axis, wherein the outer rotor core comprises a plurality of outer laminated sheets, each of the outer laminated sheets being axially skewed with respect to neighboring ones of the outer laminated sheets and comprising a plurality of outer ferromagnetic regions and a plurality of outer non-ferromagnetic regions formed of a single material, wherein the outer ferromagnetic and the non-ferromagnetic regions are selectively formed so as to reduce a contribution of at least one harmonic component of magnetic flux generated by the outer fractional-slot concentrated windings, and wherein the inner rotor core comprises a plurality of inner laminated sheets, each of the inner laminated sheets being axially skewed with respect to neighboring ones of the inner laminated sheets and comprising a plurality of inner ferromagnetic regions and a plurality of inner non-ferromagnetic regions formed of a single material, wherein the inner ferromagnetic and the non-ferromagnetic regions are selectively formed so as to reduce a contribution of at least one harmonic component of magnetic flux generated by the inner fractional-slot concentrated windings.

14. The synchronous reluctance machine of claim 13, wherein the inner and the outer laminated sheets have an integral structure, wherein the single material comprises a dual phase ferromagnetic material, and wherein the inner and the outer laminated sheets are subjected to a localized surface treatment to form the inner and the outer non-ferromagnetic regions respectively.

15. The synchronous reluctance machine of claim 13, wherein the inner laminated sheets and the outer laminated sheets are skewed in a straight pattern.

16. The synchronous reluctance machine of claim 13, wherein the inner laminated sheets and the outer laminated sheets are skewed in a herringbone pattern.

17. The synchronous reluctance machine of claim 13, wherein the outer ferromagnetic and the outer non-ferromagnetic regions are further selectively formed so as to enhance a synchronous component reluctance torque, and wherein the inner ferromagnetic and the inner non-ferromagnetic regions are further selectively formed so as to enhance a synchronous component reluctance torque.

18. The synchronous reluctance machine of claim 17, wherein at least one of each of the inner and the outer non-ferromagnetic regions are formed around an inner or an outer surface of the rotor core to reduce a lower order harmonic component of magnetic flux.

19. A synchronous reluctance machine comprising:
a stator comprising an inner stator portion and an outer stator portion, wherein the inner stator portion comprises an outer surface and a plurality of inner fractional-slot windings wound around a plurality of inner stator teeth disposed on the outer surface, and wherein the outer stator portion comprises an inner surface and a plurality of outer fractional-slot windings wound around a plurality of outer stator teeth disposed on the inner surface; and a double sided rotor comprising an inner rotor side and an outer rotor side, wherein the double sided rotor is concentrically disposed between the inner stator portion and the outer stator portion about a central axis, wherein the outer rotor side comprises a plurality of outer laminated sheets, each of the outer laminated sheets being axially skewed with respect to neighboring ones of the outer laminated sheets and comprising a plurality of outer ferromagnetic regions and a plurality of outer non-ferromagnetic regions formed of a single material, wherein the outer ferromagnetic and the non-ferromagnetic regions are selectively formed so as to reduce a contribution of at least one harmonic component of magnetic flux generated by the outer fractional-slot concentrated windings, and wherein the inner rotor side comprises a plurality of inner laminated sheets, each of the inner laminated sheets being axially skewed with respect to neighboring ones of the inner laminated sheets and comprising a plurality of inner ferromagnetic regions and a plurality of inner non-ferromagnetic regions formed of a single material, wherein the inner ferromagnetic and the non-ferromagnetic regions are selectively formed so as to reduce a contribution of at least one harmonic component of magnetic flux generated by the inner fractional-slot concentrated windings.

20. The synchronous reluctance machine of claim 19, wherein the inner and the outer laminated sheets have an integral structure, wherein the single material comprises a dual phase ferromagnetic material, and wherein the inner and the outer laminated sheets are subjected to a localized surface treatment to form the inner and the outer non-ferromagnetic regions respectively.

21. The synchronous reluctance machine of claim 19, wherein the inner and the outer laminated sheets are skewed in a straight pattern.

22. The synchronous reluctance machine of claim 19, wherein the inner and the outer laminated sheets are skewed in a herringbone pattern.

23. The synchronous reluctance machine of claim 19, wherein the outer ferromagnetic and the outer non-ferromagnetic regions are further selectively formed so as to enhance a synchronous component reluctance torque, and wherein the inner ferromagnetic and the inner non-ferromagnetic regions are further selectively formed so as to enhance a synchronous component reluctance torque.

24. The synchronous reluctance machine of claim 23, wherein at least one of each of the inner and the outer non-ferromagnetic regions are formed around an inner surface of the rotor core to reduce a lower order harmonic component of magnetic flux.

* * * * *